July 24, 1962  J. M. HARRISON  3,045,286
METHOD OF MAKING DISPENSABLE CUPS
Filed Aug. 26, 1959  2 Sheets-Sheet 1

INVENTOR.
James M. Harrison,
BY Parker & Carter
Attorneys.

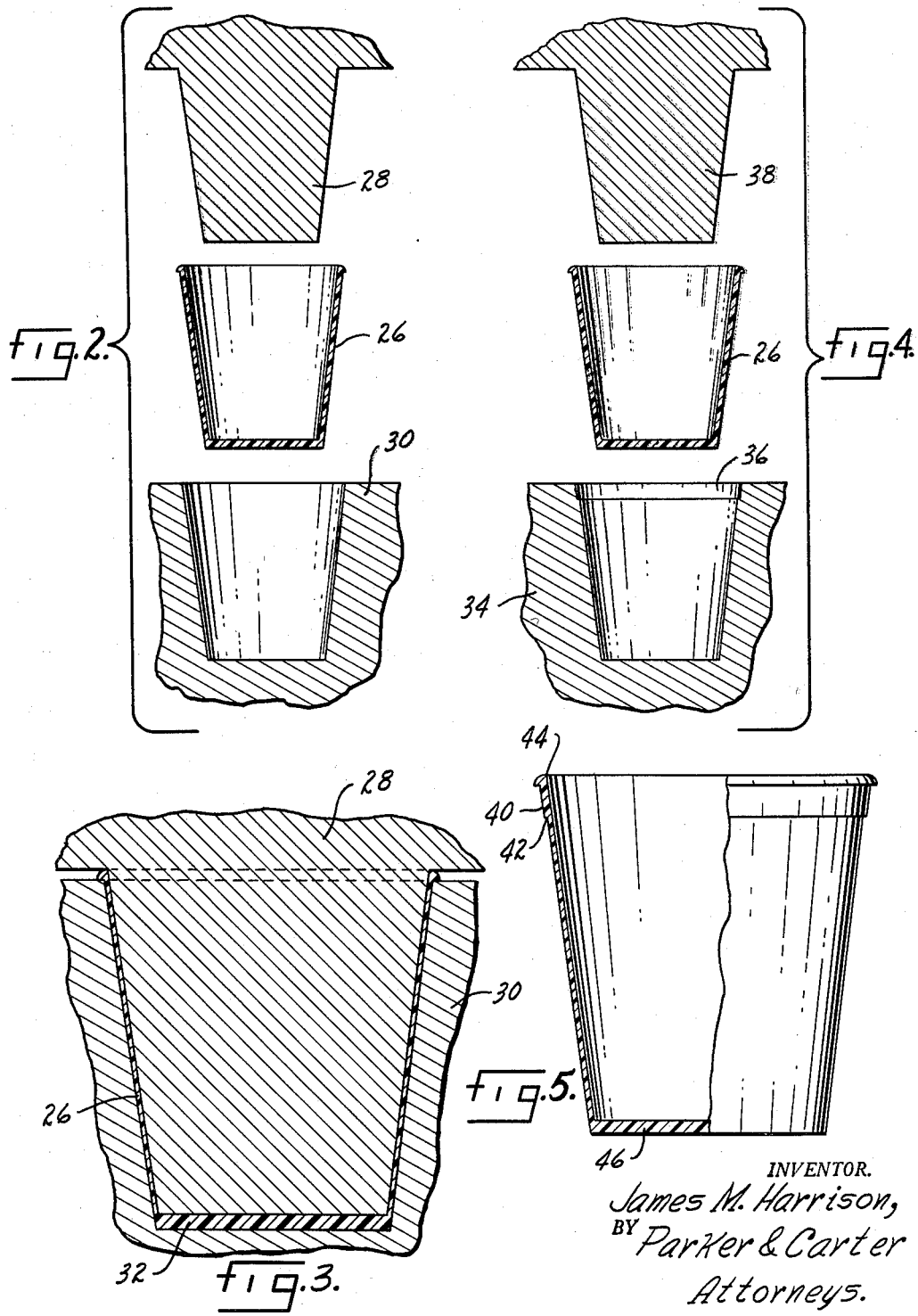

United States Patent Office 3,045,286
Patented July 24, 1962

---

3,045,286
METHOD OF MAKING DISPENSABLE CUPS
James M. Harrison, Fort Worth, Tex., assignor to Crown Machine & Tool Company, Fort Worth, Tex., a corporation of Texas
Filed Aug. 26, 1959, Ser. No. 836,124
6 Claims. (Cl. 18—48)

This invention is in the field of containers or cups and is concerned with a method of making a foamed plastic cup which may be used in automatic dispensing equipment, for example in a machine of the coin controlled type for dispensing hot coffee or cold beverages.

A primary object of my invention is a method of making a foamed plastic cup which insures that such cups will be closely spaced when stacked or nested.

Another object is a method of making such a cup without losing its rigidity and heat insulating characteristics.

Another object is a method of making an inexpensive rigid foamed plastic cup with a stepped side wall so that it may be stacked and used in coin controlled vending or dispensing machines.

Another object is a method of making a rigid foamed plastic container for use in dispensing machines which results in a saving in plastic.

Other objects will appear from time to time in the ensuing specification and drawings in which:

FIGURE 2 is a schematic showing of one of the steps in the procedure with the mold open;

FIGURE 3 is an enlarged view of FIGURE 2 with the mold closed;

FIGURE 4 is similar to FIGURE 2 but showing a variation; and

FIGURE 5 is a side view of a cup formed according to the FIGURE 4 variation, partly in section and on an enlarged scale.

Figure 1:
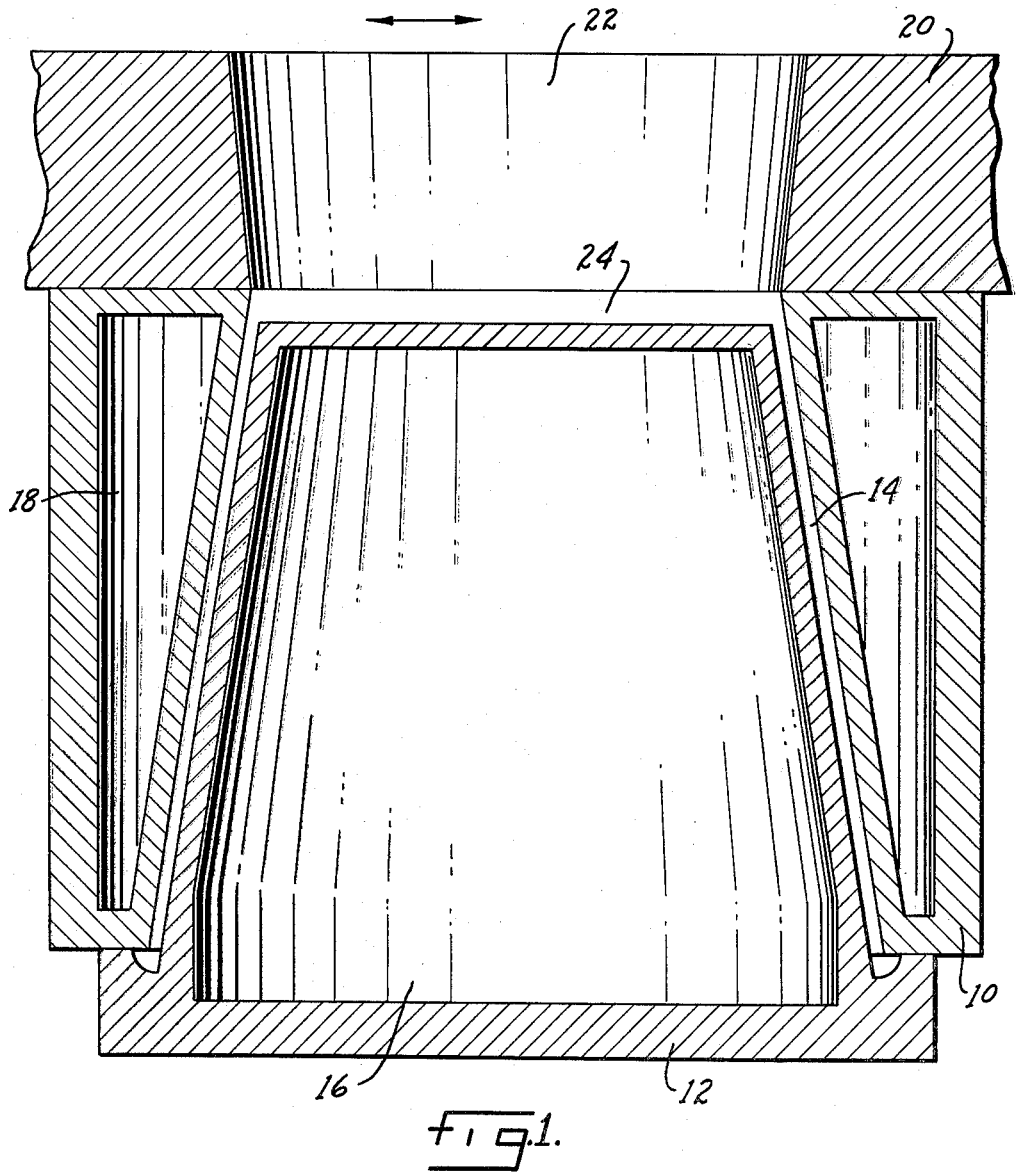
FIGURE 1 is a schematic section of a typical molding cavity.

In FIGURE 1 I have shown a molding cavity defined by mold parts which includes a cavity element 10 and a core element 12 adapted to be inserted in the cavity to define a molding cavity 14 which, as shown, is in the shape of a cup. In FIGURE 1 it has been shown upside down with the bottom of the cup up, but it could be the other way. The core 12 may have a suitable chamber 16 and the cavity may have a similar chamber 18. It will be noted that chamber 18 surrounds the molding cavity 14 while chamber 16 lies inside of it, each of them closely approaching the cavity and being separated from it by only a thin wall. Thus, when any hot substance, such as steam or the like, is introduced into the chambers, the contents of the molding cavity 14 will be quickly heated to any desired temperature. I have shown the top of the cavity as completely open and a suitable slide or valve 20, with a transfer cavity 22, may be reciprocated in any suitable manner as indicated and plastic beads may be supplied from an offset hopper, not shown, to the transfer cavity 22. When the valve is reciprocated, the transfer cavity 22 will move to the FIGURE 1 position at which point the beads in the transfer cavity will move down into the inverted cup-shaped molding cavity 14. Then the transfer valve may be moved back and the top of cavity 14 will be covered or closed by a portion of the transfer valve. The top of core 12 does not extend all the way up to the top of the cavity and a slight spacing exists so that the bottom of the cup will be formed as at 24. This structure is shown more or less in detail in copending application Serial No. 687,394, filed October 1, 1957, now Patent No. 2,951,260.

Foamed plastics are known. They generally come in the form of raw beads which are finely divided plastic granules impregnated with a suitable foaming agent or blowing agent or gas. For example, the beads might be polystyrene which could be impregnated with methyl chloride, butane, heptane, or the like. When the beads are heated to a certain temperature, for example 230° to 240° F., the gases will cause the individual beads to expand and the beads can be blown up to many times their original size. Initially, the raw beads are quite small and may be only a few thousandths of an inch in diameter. It is conventional to apply an intermediate temperature to the beads, something less than their maximum foaming temperature so that the beads will be partially expanded. This is known as prefoaming and the beads are brought up to something on the order of .050 of an inch in diameter. Then they are supplied to the cavity and the maximum foaming temperature is applied causing the beads to further expand to completely fill the cavity and to fuse with one another and form an integral completely homogeneous article.

Prefoaming normally brings the beads up to something on the order of from .040 to .060 of an inch. The prefoamed beads are then put in the hopper, mentioned above but not shown, and the transfer valve 20, in FIGURE 1, takes the prefoamed beads from the hopper and brings them to the molding cavity 14. The side walls of the molding cavity must be separated by a distance substantially greater than the diameter of the prefoamed beads so that the beads will move by gravity and an air pressure differential, from the transfer chamber 22 down into the side walls of the molding cavity. In the case of prefoamed beads having a diameter from .040 to .060 of an inch, I find it most practical to have the walls of the cavity separated by something on the order of .100 of an inch. The molding cavity is then closed, the foaming temperature is applied by supplying steam to the chambers 16 and 18, and the beads fully expand and tightly fuse with one another. The cavity is cooled and opened and the finished cup is removed.

A cup made in the manner described above would be suitable for most uses. But in the case of cups to be used in coin controlled dispensing machines, for coffee or the like, the cups will not nest sufficiently close to one another. This is to say that the cups will not stack properly since the walls are too thick and in any given height relatively few cups can be stacked.

One approach would be to increase the angle of divergence of the walls of the cup so that they would stack more closely. But such a cup becomes too wide at the top, too narrow at the bottom, and is too flat and unsightly. Further, dispensing machines are constructed so that the top of the cup has to conform to a certain diameter. To increase the angle of divergence of the side walls would mean reducing the diameter of the cup at the bottom which is totally impractical.

I have determined, however, that such a cup may be compressed without damaging or substantially reducing its otherwise desirable characteristics.

For example, in FIGURE 2 the cup, indicated generally at 26, may be considered to have just been molded according to the procedure set forth hereinabove. Suitable press or die elements may be used, for example a core 28 and a cavity 30. The cup 26 may be dropped in the cavity. Then the core may be lowered and adequate pressure applied to compress the side walls of the cup. I have determined that side walls may be reduced in thickness from approximately .100 of an inch to approximately .025 of an inch without substantially altering the heat transfer or rigidity characteristics of the cup.

In FIGURE 3 the die or press elements have been shown closed and it will be noted that the side walls of the cup have been substantially reduced in thickness. Foamed material of this type is an excellent heat barrier and will not conduct heat. Thus, it may be ideally used for coffee cups. When the wall thickness is at the "as molded" thickness, for example .100 of an inch, the cup may be filled with boiling water and the outer surface will be sufficiently cool to be picked up by hand. When the wall thickness of such a cup is reduced to a fraction of its "as molded" thickness, it will nevertheless retain the majority, if not all, of its heat insulation characteristics. Further, it will still be sufficiently rigid to stand up and will not collapse when subjected to hand pressure or when filled with a hot liquid.

It will be noted in FIGURE 3 that the bottom of the cup, as at 32, has been left at its original thickness and I prefer that the bottom be unchanged to insure against leakage.

In its "as molded" condition in FIGURE 1, the cup will have certain inside and outside dimensions or diameters. I prefer that the outside dimensions be retained after the compressing step. Thus, the cavity in the cavity die 30 will conform exactly or approximately to the outside or exterior of an "as molded" cup. But the core 28 will be somewhat larger than the inner dimensions of the cup. When the two dies are brought together and compressed, the inner surfaces of the cup will be moved out while the outer surface will be kept in place. Thus, the material in the side wall adjacent the inner surface will be more compressed or compact than otherwise and it will be fully sealed against any possible leakage. Additionally, the dimensional stability of the cup will be increased and no cracks or ruptures will develop between the side walls and the base.

A variation of this procedure is shown in FIGURES 4 and 5 in which the cavity die 34 has a shoulder or offset 36, shown in this case as adjacent the upper edge or lip of the cup. On occasion it may be desirable to hold the inner or inside dimensions of the cup constant and to move the outer surface of the side wall in. In this case, the cavity in the cavity die would be somewhat smaller than the outside of the cup in its "as molded" condition. The core 38 should approximately fit the inside of the cup so that the outside surface would be moved in when pressure is applied. The step or offset 36, however, might have an external diameter which conformed to the outside of the cup in its "as molded" condition. Thus, when pressure is applied, the outer surface of the cup below the step would be moved in and, as shown in FIGURE 5, the resulting cup would have a pronounced step or shoulder 40 adjacent its upper edge. It will be noted that the offset or ledge or step has its lower surface 42 axially aligned with the top rim 44 of the cup. Thus, when a number of such cups are stacked, the ledge 42 of one will hit the rim 44 of the next. A load carrying axial column will be provided and the side walls will not be subjected to compression. Even more important, the thickened portion 40 will provide substantial rigidity or stability around the top of the cup and will serve as a reinforcement at the top preventing lateral buckling or deflection. As before, the bottom 46 may be in its "as molded" condition and pressure is not necessarily applied to it.

The use, operation and function of the invention are as follows:

A cup of this type can only be molded on a practical basis with what I shall refer to as somewhat thick side walls due to the necessity of using prefoamed beads. I have given .100 of an inch as an example of wall thickness, but it might vary somewhat. Cups with this wall thickness will be quite widely spaced or separated when nested and a vending machine, which has space limitations, would only hold a limited number of them.

I have found that by compressing the side walls down to a fraction of their original thickness after they are molded, for example from .100 of an inch to .025 of an inch, I can double the number of cups that can be stacked in a given space.

I prefer to use an expanding mandrel or core which means that the core will be oversize as compared to the inside of an "as molded" cup and the cavity will be the same size. The cavity and core are brought together axially. In a sense pressure is applied axially but in reality the surface of the core will slide along the inside of the cup and material movement will be primarily lateral or radial. Since the material will be compressed, a less dense bead may be initially used. I have stated that I prefer that the inner surface of the cup be moved out toward the outer surface during the compressing step, but it might be reversed. Or it might be a combination of both. I have shown the offset or shoulder at the top in FIGURES 4 and 5 but it might be on the inside and adjacent the bottom.

A cup produced by this method will stack sufficiently close so that it may be used in automatic vending machines and the spacing will be about the same as presently used paper cups. Additionally, a cup of this type will have excellent heat insulation characteristics and its rigidity will be such that it will not deform substantially in use when subjected to hand pressure or otherwise.

Another important aspect of the invention is that the material should be rigid and should take a permanent set when compressed. This is to say that it should remain in or retain its compressed condition and should not creep back. Certain plastics are known to have a characteristic described as "plastic memory" which means that they tend to return or re-expand slowly after being compressed or deformed. All sponge type plastics, such as foamed polyvinyl chloride, have a tendency to return or flow back. Rigid plastics, such as foamed polystyrene, will take an approximate set when compressed and will not re-expand of their own accord. In the case of foamed polystyrene, the core and cavity pressing elements do not have to be held together for a long time for the "set" to take place. With certain other plastics, this might be necessary. But, in any event, it is undesirable since rapid production leading to an inexpensive product is the essence of success of a disposable cup of this nature.

While I have shown and described the preferred form and suggested several variations of my invention, it should be understood that suitable additional modifications, changes, substitutions and alterations may be made without departing from the invention's fundamental theme. I, therefore, wish that the invention be unrestricted except as by the appended claims.

I claim:

1. A method of making a relatively rigid foamed plastic cup capable of being dispensed, from a foamed plastic that is rigid in character and is capable of taking a permanent set when compressed, including the steps of providing a cup shaped molding cavity and supplying beads to the cavity of such a foamable plastic having a diameter substantially less than the thickness of the cavity, heating the beads in the cavity to their foaming temperature, while maintaining the size and thickness of the cavity constant, thereby expanding the beads and causing them to completely fill the cavity and to fuse to one another and form a foamed dimensionally stable plastic cup having a wall thickness generally equal to the thickness of the cup cavity, and thereafter applying uniform pressure, without heat, to substantially the entire portion of the cup side walls to reduce the thickness of the cup side walls to a thickness no greater than the diameter of the beads placed in the cavity.

2. The method of claim 1 further characterized in that the walls of the molding cavity are separated by a distance on the order of .100 of an inch so that the cup, as initially formed, has a .100 of an inch wall thickness, and further characterized in that the walls of the cup are compressed to a thickness on the order of .025 of an inch.

3. The method of claim 1 further characterized in that the compressing step includes supporting the outer surface of the cup side wall and applying pressure to the inner surface of the side wall to move it outwardly toward the outer surface so that, as compared to the cup immediately after expansion of the beads by heating, the finished cup will have the same outside dimensions but will have increased inside dimensions.

4. The method of claim 1 further characterized by and including the step of leaving the bottom of the cup in its as molded condition.

5. The method of claim 1 further characterized in that the compressing step includes omitting pressure from a band of limited axial extent adjacent one end of the cup so that, after compressing, a step will be provided in the side wall to function as a supporting ledge for contacting adjacent cups when a plurality of such cups are stacked.

6. The method of claim 1 further characterized in that said beads are prefoamed polystyrene.

References Cited in the file of this patent
UNITED STATES PATENTS

| | | |
|---|---|---|
| 2,013,702 | Smidth | Sept. 10, 1935 |
| 2,659,935 | Hammon | Nov. 24, 1953 |
| 2,722,719 | Altstadter | Nov. 8, 1955 |
| 2,744,391 | Stastny | May 8, 1956 |
| 2,767,436 | Noland et al. | Oct. 23, 1956 |
| 2,813,053 | Tuomala | Nov. 12, 1957 |
| 2,899,708 | Donaldson et al. | Aug. 18, 1959 |

OTHER REFERENCES

Koppers booklet, Dylite-Expandable-Polystyrene, 1954, pages 3, 14, 15, 19, 21–23.